(12) United States Patent
Hernandez, Jr.

(10) Patent No.: US 9,997,860 B1
(45) Date of Patent: Jun. 12, 2018

(54) COVERPLATE AND METHOD FOR ELECTRICAL OUTLET

(71) Applicant: Alltrade Tools LLC, Cypress, CA (US)

(72) Inventor: Hector R. Hernandez, Jr., Fullerton, CA (US)

(73) Assignee: ALLTRADE TOOLS LLC, Cypress, CA (US)

( * ) Notice: Subject to any disclaimer, the term of this patent is extended or adjusted under 35 U.S.C. 154(b) by 0 days. days.

(21) Appl. No.: 15/783,971

(22) Filed: Oct. 13, 2017

(51) Int. Cl.
| | |
|---|---|
| *H01R 13/447* | (2006.01) |
| *H01R 13/717* | (2006.01) |
| *H01R 43/20* | (2006.01) |
| *H01R 13/506* | (2006.01) |
| *H01R 13/24* | (2006.01) |
| *H01R 25/00* | (2006.01) |

(52) U.S. Cl.
CPC ....... *H01R 13/447* (2013.01); *H01R 13/2457* (2013.01); *H01R 13/506* (2013.01); *H01R 13/7175* (2013.01); *H01R 43/20* (2013.01); *H01R 25/006* (2013.01)

(58) Field of Classification Search
CPC ...... H02G 3/14; H01R 13/717; H01R 25/006; H01R 13/7175; H01R 13/447
See application file for complete search history.

(56) References Cited

U.S. PATENT DOCUMENTS

| | | | | |
|---|---|---|---|---|
| 2,934,590 | A | * | 4/1960 | Thompson ............. H02B 1/048 174/53 |
| 3,522,595 | A | * | 8/1970 | White .................... G08B 17/06 174/66 |
| 3,739,226 | A | | 6/1973 | Seiter et al. |
| 4,282,591 | A | * | 8/1981 | Andreuccetti ......... G01D 11/30 174/66 |
| 4,514,789 | A | | 4/1985 | Jester |
| 4,534,486 | A | * | 8/1985 | Eidson .................. F16B 21/086 174/66 |
| 4,617,613 | A | * | 10/1986 | Rice ...................... H01R 13/717 362/95 |
| 4,755,913 | A | * | 7/1988 | Sleveland .............. H01H 9/161 200/310 |
| 4,774,641 | A | * | 9/1988 | Rice ........................ F21S 8/035 174/66 |
| 5,485,356 | A | * | 1/1996 | Nguyen ............... H01R 13/717 174/66 |
| 5,670,776 | A | * | 9/1997 | Rothbaum .............. F21S 8/035 250/214 AL |

(Continued)

*Primary Examiner* — Ross Gushi

(74) *Attorney, Agent, or Firm* — David J. Pitman; Fulwider Patton LLP

(57) ABSTRACT

A coverplate for attachment to a standard electric power outlet, the coverplate comprising: a faceplate occupying a first plane and defining at least one opening sized to provide access to the standard electric power outlet; a support frame attached to the faceplate, the support frame comprising: a U-shaped element occupying a second plane; a first receptor flange and a second receptor flange, each extending from the U-shaped element, wherein the first receptor flange defines a first chamber containing a first conductor and the second receptor flange defines a second chamber containing a second conductor; and wherein the first conductor and the second conductor are spaced apart by a first distance which is equal to a standard distance on the standard electric power outlet separating two electric power elements.

11 Claims, 7 Drawing Sheets

(56) References Cited

U.S. PATENT DOCUMENTS

| | | | | |
|---|---|---|---|---|
| 5,683,166 A * | 11/1997 | Lutzker | ............... | H05B 33/06 250/466.1 |
| 5,816,682 A * | 10/1998 | Marischen | ............... | F21S 8/035 362/84 |
| 5,833,350 A * | 11/1998 | Moreland | ............... | H01H 9/18 362/95 |
| 6,087,588 A * | 7/2000 | Soules | ............... | H01H 9/185 174/66 |
| 6,423,900 B1 * | 7/2002 | Soules | ............... | H01H 9/185 174/66 |
| 6,547,411 B1 * | 4/2003 | Dornbusch | ............... | F21S 8/035 362/276 |
| 6,883,927 B2 * | 4/2005 | Cunningham | ............... | A47L 5/38 362/149 |
| 6,943,296 B2 | 9/2005 | Perrella et al. | | |
| 7,036,948 B1 * | 5/2006 | Wyatt | ............... | H01R 13/6683 362/276 |
| 7,118,235 B2 | 10/2006 | Barton | | |
| 7,270,436 B2 * | 9/2007 | Jasper | ............... | G09F 13/04 174/66 |
| 7,506,990 B2 * | 3/2009 | Glazner | ............... | F21S 8/035 200/317 |
| 7,547,131 B2 * | 6/2009 | Faunce | ............... | F21V 33/006 362/209 |
| 7,549,785 B2 * | 6/2009 | Faunce | ............... | F21V 33/006 362/209 |
| 7,741,562 B2 | 6/2010 | Crotinger et al. | | |
| 7,850,322 B2 * | 12/2010 | Glazner | ............... | H05B 33/0803 362/95 |
| 7,915,529 B2 | 3/2011 | Crotinger et al. | | |
| 8,075,149 B2 * | 12/2011 | Ko | ............... | H05B 33/0815 315/363 |
| 8,304,652 B2 * | 11/2012 | McBain | ............... | H01R 13/443 174/66 |
| 8,393,747 B2 * | 3/2013 | Kevelos | ............... | H01H 13/83 362/551 |
| 8,444,309 B2 * | 5/2013 | Jansen | ............... | H01H 9/182 362/551 |
| 8,558,710 B1 * | 10/2013 | Nitz | ............... | H02G 3/18 340/654 |
| 8,668,347 B2 * | 3/2014 | Ebeling | ............... | H01R 13/5213 174/66 |
| 8,770,424 B1 * | 7/2014 | Shaw | ............... | H02G 3/14 220/242 |
| 8,797,723 B2 * | 8/2014 | Hilton | ............... | H02G 3/14 315/159 |
| 8,912,442 B2 * | 12/2014 | Smith | ............... | H02G 3/14 174/66 |
| 9,035,180 B2 * | 5/2015 | Smith | ............... | H02G 3/14 174/66 |
| 9,035,181 B2 * | 5/2015 | Smith | ............... | H05K 5/03 174/66 |
| 9,196,998 B1 * | 11/2015 | Billington | ............... | H02G 3/14 |
| 9,362,728 B2 * | 6/2016 | Smith | ............... | H02G 3/14 |
| 9,464,795 B2 * | 10/2016 | Ebeling | ............... | H01R 13/5213 |
| 9,482,426 B2 * | 11/2016 | Diotte | ............... | F21V 33/006 |
| 9,633,584 B2 * | 4/2017 | Underwood | ............... | G09F 13/20 |
| 9,742,111 B2 * | 8/2017 | Smith | ............... | H02G 3/14 |
| 9,755,374 B2 * | 9/2017 | St. Laurent | ............... | H01R 13/7175 |
| 9,768,562 B2 * | 9/2017 | Smith | ............... | H01R 13/6675 |
| 9,774,154 B2 * | 9/2017 | St. Laurent | ............... | H01R 25/006 |
| 9,787,025 B2 * | 10/2017 | Smith | ............... | H02G 3/14 |
| 9,832,841 B2 * | 11/2017 | Knight | ............... | H05B 37/0218 |
| 9,871,324 B2 * | 1/2018 | Smith | ............... | H01R 13/631 |
| 9,882,318 B2 * | 1/2018 | Smith | ............... | H01R 13/665 |
| 9,882,361 B2 * | 1/2018 | Smith | ............... | H02G 3/081 |
| 9,899,814 B2 * | 2/2018 | Smith | ............... | H02G 3/081 |
| 9,917,430 B2 * | 3/2018 | Smith | ............... | H02G 3/14 |
| 2003/0092297 A1 * | 5/2003 | Reindle | ............... | H01R 31/02 439/107 |
| 2003/0124022 A1 * | 7/2003 | Georges | ............... | A61L 9/03 422/5 |
| 2006/0072302 A1 * | 4/2006 | Chien | ............... | F21S 8/035 362/84 |
| 2006/0262462 A1 * | 11/2006 | Barton | ............... | F21S 9/022 361/1 |
| 2007/0171625 A1 * | 7/2007 | Glazner | ............... | F21S 8/035 362/95 |
| 2007/0291469 A1 * | 12/2007 | Chen | ............... | H01H 9/181 362/95 |
| 2009/0225480 A1 * | 9/2009 | Baxter | ............... | H02H 11/005 361/42 |
| 2009/0284385 A1 * | 11/2009 | Tang | ............... | H02G 3/12 340/638 |
| 2012/0008307 A1 * | 1/2012 | Delany | ............... | H01H 9/182 362/95 |
| 2016/0248202 A1 | 8/2016 | Smith et al. | | |
| 2017/0013736 A1 * | 1/2017 | Ebeling | ............... | H01R 13/5213 |
| 2017/0018890 A1 * | 1/2017 | St. Laurent | ............... | H01R 13/7175 |
| 2017/0018897 A1 * | 1/2017 | St. Laurent | ............... | H01R 25/006 |
| 2017/0214188 A1 * | 7/2017 | Smith | ............... | H01R 13/665 |
| 2017/0214229 A1 * | 7/2017 | Smith | ............... | H02G 3/081 |
| 2017/0222364 A1 * | 8/2017 | Smith | ............... | H01R 13/6272 |
| 2017/0222414 A1 * | 8/2017 | Smith | ............... | H02G 3/0437 |
| 2017/0222417 A1 * | 8/2017 | Smith | ............... | H02G 3/14 |
| 2018/0048099 A1 * | 2/2018 | Diotte | ............... | H01R 13/717 |

* cited by examiner

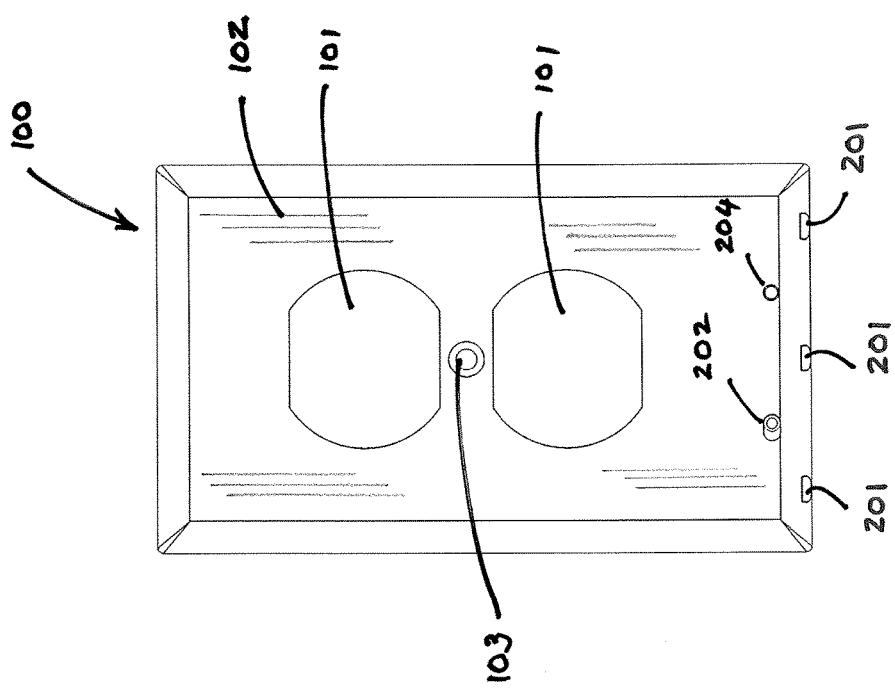

COVERPLATE AND METHOD FOR ELECTRICAL OUTLET

BACKGROUND

Electric power outlets are commonly provided on a wall of a building structure. A switch may be attached to the power outlet permitting a user to complete a circuit through the power outlet to switch on a light, or other appliance. Alternatively, the power outlet may provide a connection socket to permit a user to insert the terminals of a power driven appliance such as a heater, cooler, kitchen appliance, or the like. Typically, such power outlets are covered by a coverplate, protecting the power supply on the wall from accidental human contact, and thus providing a safety feature.

In recent years, it has become a common feature of a coverplate to provide a function in addition to its safety feature. The coverplate may be provided with two terminals that extend rearwardly from the coverplate, configured to make contact with the two electrically live power terminals on the power outlet, thereby drawing a small amount of current to power small low power devices that are attached to the rear side of the coverplate. It is known that most power outlets have a standard dimension, so that the distance of separation of power terminals on a standard power outlet are known, and this distance of separation is also given to the rearwardly extending terminals on the coverplate so that the rearwardly extending terminals may conveniently contact the power terminals on the outlet. Such low power devices may include features such as LEDs to provide floor lighting, or LEDs to provide an indication whether the power through the outlet is on or off. These LEDs may further be controlled by switches such as motion detector switches, or photosensor switches.

However, a problem in the prior art arises during the manufacture and assembly of such coverplates, and this problem during assembly may extend to the safety of the resulting coverplate once it is manufactured and assembled. During assembly, the complexity of assembling a fairly complex electric circuit onto the back of a coverplate is made difficult by the fact that numerous components and elements must be connected to the coverplate, thus giving rise to the potential for assembly error. As a result, the eventual product may present the consumer public with a product that is not sufficiently safe for installation onto power outlets that are powered by live electricity. The present invention addresses these and other needs.

SUMMARY OF THE INVENTION

In one embodiment, the invention is a coverplate for attachment to a standard electric power outlet having two electric power elements separated by a standard distance. The coverplate comprises a faceplate occupying a first imaginary plane and defining at least one opening sized to provide access to the standard electric power outlet when the power outlet is covered by the faceplate. A support frame is provided that is detachably attached to the faceplate. The support frame comprises a U-shaped element occupying a second imaginary plane parallel with the first imaginary plane. A first receptor flange extends from the U-shaped element, and the first receptor flange defines a first chamber. A second receptor flange extends from the U-shaped element, and the second receptor flange defining a second chamber. A first conductor is positioned within the first chamber, and a second conductor is positioned within the second chamber. Under this arrangement, the first conductor and the second conductor are spaced apart by a first distance which is equal to the standard distance on the standard electric power outlet.

In some embodiments, the first conductor and the second conductor are held within the first chamber and the second chamber respectively by friction fit. In other embodiments, the first receptor flange and the second receptor flange extend perpendicular to the second imaginary plane. In yet further embodiments, the support frame is detachably attached to the faceplate via locator pins inserted within locator holes. In even further embodiments, the support frame further includes at least one LED connected by an electric circuit to the first conductor and the second conductor. In other embodiments, a first locator flange and a second locator flange are attached to the faceplate, each extending perpendicular to the first imaginary plane and being positioned to coincide with and to be at least partially surrounded by the first receptor flange and second receptor flange respectively. Under this arrangement, the first chamber defines a first window through which a portion of the first conductor protrudes, and the second chamber defines a second window through which a portion of the second conductor protrudes.

In another embodiment, the invention is a method for assembling a coverplate for attachment to a standard electric power outlet. The method comprises providing a U-shaped element to which are attached a first receptor element and a second receptor element. A first conductor is inserted into a first chamber defined by the first receptor flange. A second conductor is inserted into a second chamber defined by the second receptor flange. The U-shaped element is attached to a faceplate. In some embodiments, inserting a first conductor into a first chamber includes retaining the first conductor in the first chamber by friction fit and inserting a second conductor into a second chamber includes retaining the second conductor in the second chamber by friction fit. In other embodiments, attaching the U-shaped element to a faceplate includes inserting locator pins within locator holes. In yet further embodiments, attaching the U-shaped element to the faceplate includes: enclosing the first chamber such that a curved portion of the first conductor protrudes from a first window in the first chamber; and enclosing the enclosing the second chamber such that a curved portion of the second conductor protrudes from a second window in the second chamber.

These and other advantages will become apparent when the invention is understood in conjunction with the drawings and the detailed description of some embodiments.

BRIEF DESCRIPTION OF THE DRAWINGS

FIG. 1A is a front elevational view of a coverplate having features of the invention.

DETAILED DESCRIPTION OF SOME EMBODIMENTS

Reference will now be made to the figures wherein like structures will be provided with like reference designations. It is understood that the figures are diagrammatic and schematic representations of some embodiments of the invention, and are not limiting of the present invention, nor are they necessarily drawn to scale. In some embodiments, the invention comprises a coverplate configured attachment to a power outlet on a wall.

Figure 1B:
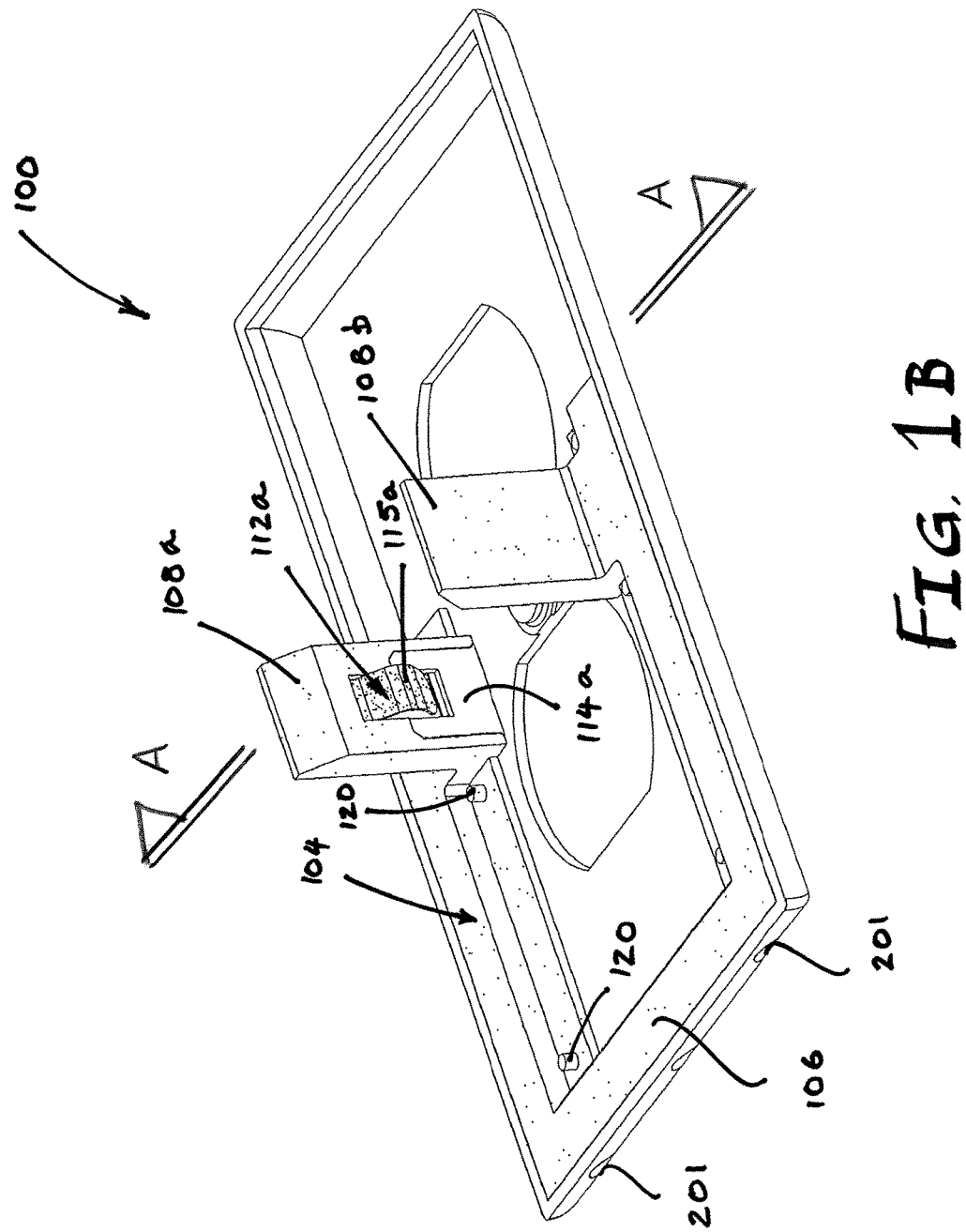
FIG. 1B is a rear perspective view of the coverplate shown in FIG. 1.
Figure 5:
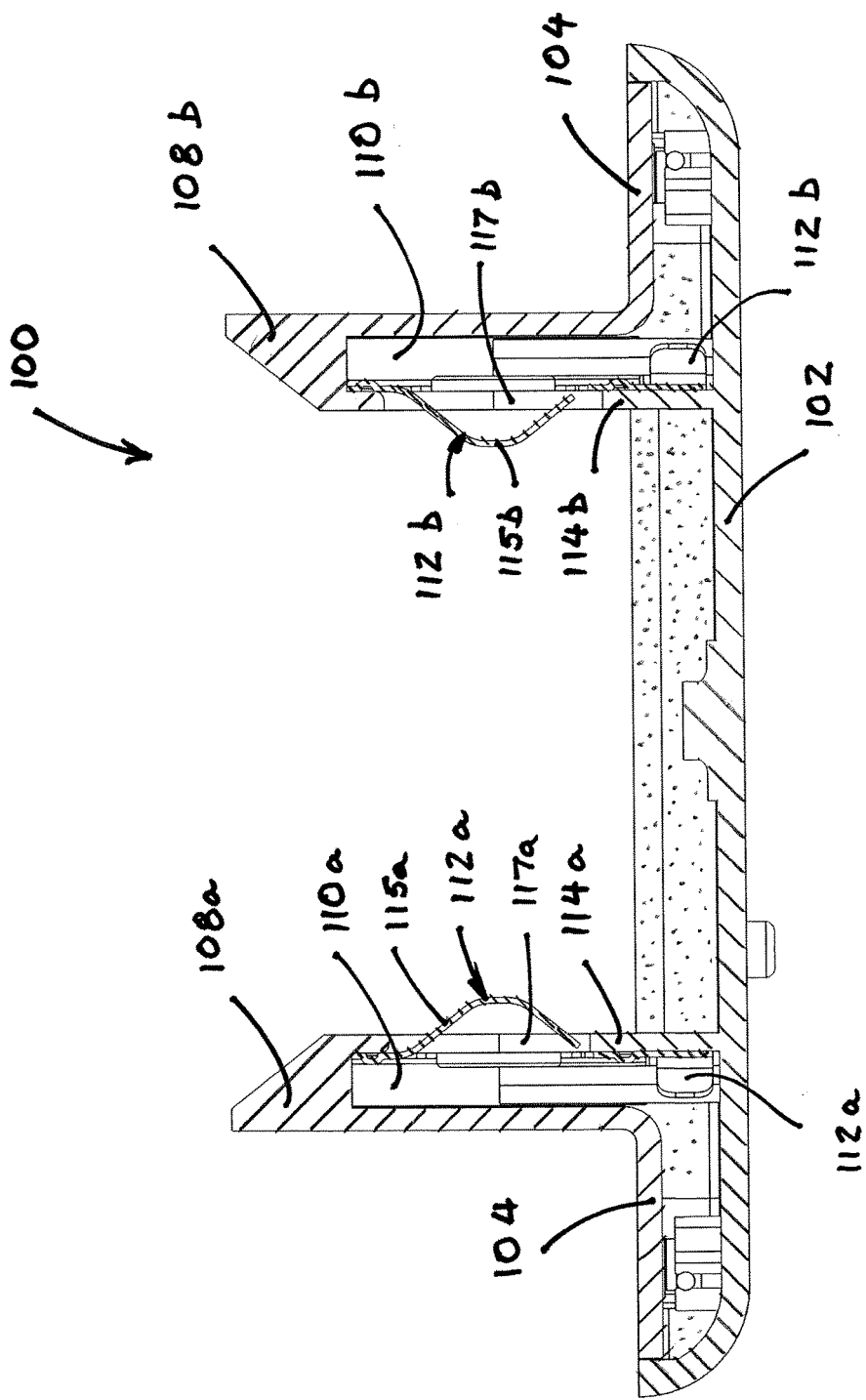
FIG. 5 is a sectional view taken substantially along the line A-A in FIG. 1B through the center of the coverplate.

FIGS. 1A, 1B and 5 illustrate an example of a coverplate 100 in an assembled condition. FIG. 1A illustrates a front view of the coverplate 100; FIG. 1B illustrates a rear perspective view of the coverplate 100; FIG. 5 illustrates a sectional view of the coverplate 100. In at least one implementation, the coverplate 100 is configured to be placed over an electrical power outlet installed on a wall. That is, in one of its functions, the coverplate 100 prevents access by human operators to an electrical box containing a power outlet—unless the coverplate is removed.

Figure 6:
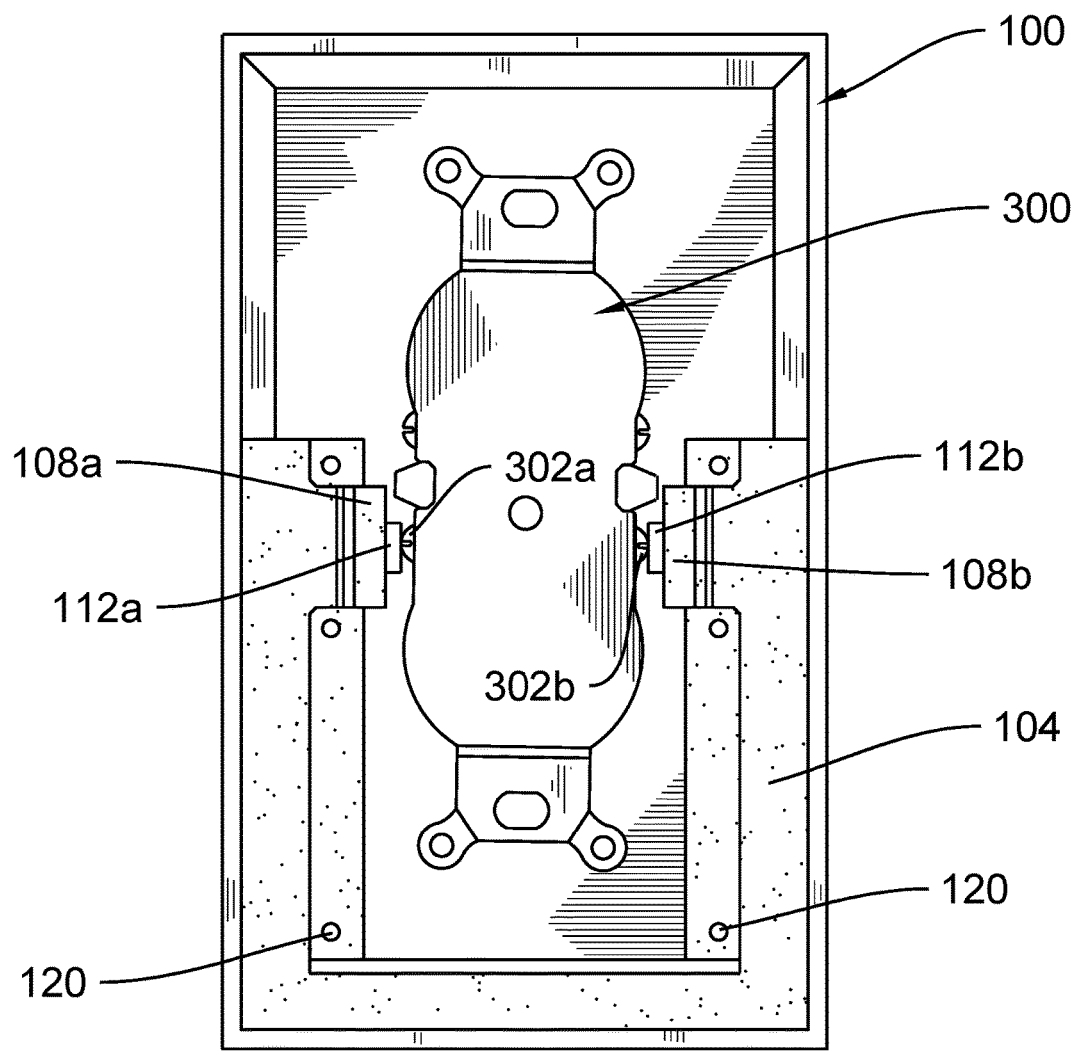
FIG. 6 is a rear elevational view of the coverplate shown in FIG. 1, shown attached to a standard power outlet.

FIGS. 1A and 1B show that the coverplate 100 includes a faceplate 102. In at least one implementation, the faceplate 102 can mate with the outlet to prevent access to the electrical box in which the outlet is mounted. That is, the faceplate can, in combination with the outlet, prevent access to the wires and connections within the electrical box. The faceplate 102 can include an insulating material to prevent electrocution of a user. For example, the faceplate 102 can include plastic. An example of a coverplate 100 connected to an outlet 300 is shown in FIG. 6, so as to close off access from the front to the electrical circuitry in the power supply.

FIGS. 1A, 1B and 5 also show that the coverplate 100 can include one or more apertures 101. In at least one implementation, the one or more apertures 101 can provide access to the outlet 300. That is, the coverplate 100 covers a portion of an outlet but allows access to another portion. For example, the faceplate 102 can prevent access to electrical connections or wiring.

FIG. 1A further shows that the coverplate 100 can include an attachment 103 such as a screw hole and a screw. The screw may be inserted into a bore in the outlet which holds the coverplate 100 in place relative to the outlet.

Figure 2:
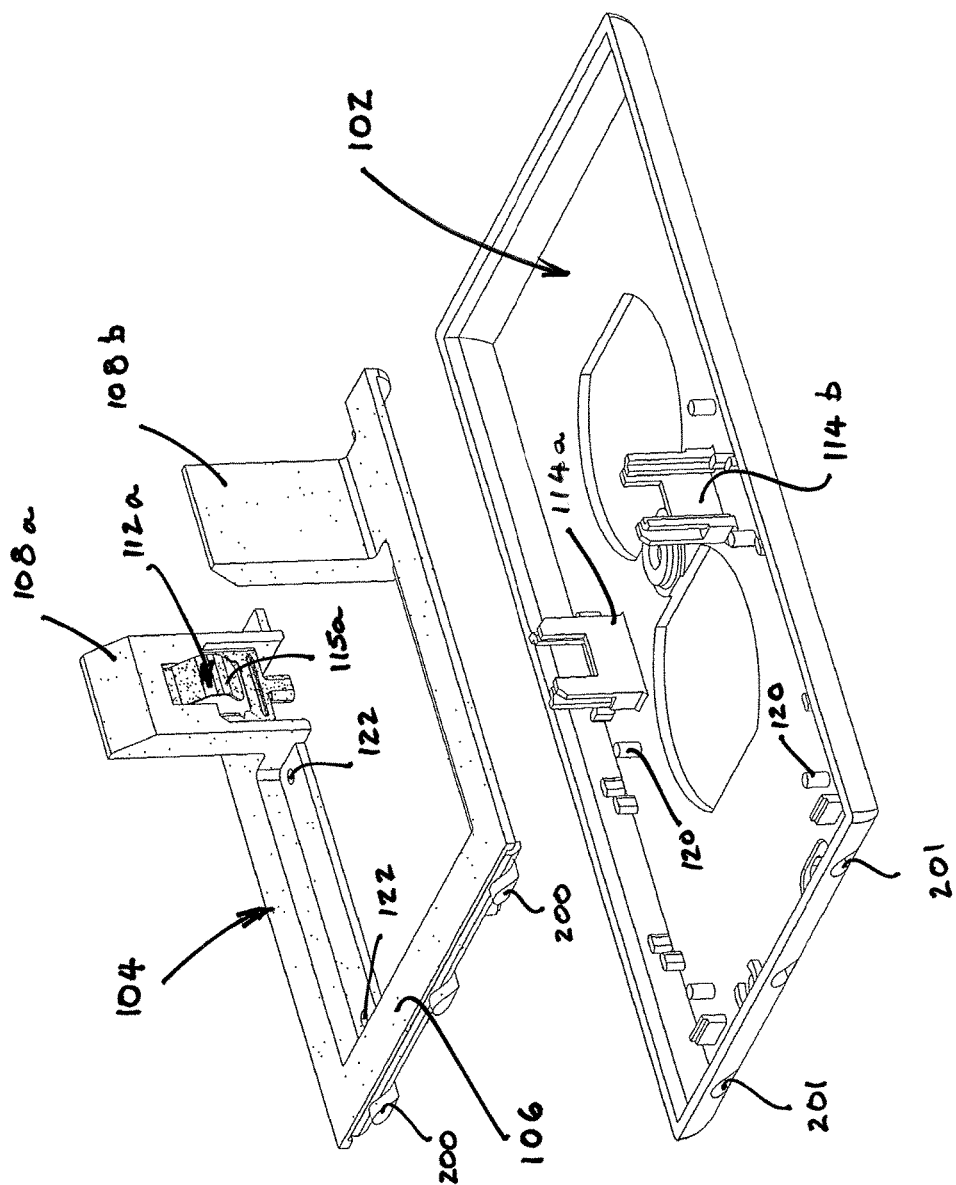
FIG. 2 is a perspective view of the coverplate shown in FIG. 1B, in a state of partial disassembly.

FIG. 2 shows that the coverplate 100 comprises two major separable components namely a support frame 104, and the faceplate 102. The support frame 104 is advantageously easily attachable to the faceplate 102. As will be described further herein, the support frame may be configured to receive and carry the majority of all other elements of the coverplate 100 during assembly before the support frame 104 is attached to the faceplate 102. This aspect of the invention provides novel advantages over the prior art.

With reference to FIG. 1B through FIG. 4, it is shown that the support frame 104 may assume the shape of a generally U-shaped structure lying in a plane, and which is sized to fit neatly into the rectangular shape of the faceplate 102 as shown in FIG. 1B. Once the support frame 104 is inserted into contact with the faceplate 102, it may be held in position by male detents 120 in the form of pins which fit into mating female detents 122 in the form of holes, wherein the male and female detents may be located opposite each other on the support frame and the faceplate.

The support frame 104 further includes receptor flanges 108a, 108b which may extend perpendicular to the plane of the support frame. Each receptor flange 108a, 108b is shaped to define a hollow interior chamber 110a, 110b respectively (best seen in FIG. 5) sized to receive and to hold a metallic conductor 112a, 112b respectively. Each metallic conductor is shaped with a curved profile so as to provide a biased contact with an outlet unit 300 (seen and described below with reference to FIG. 6) and to receive electric power from terminal points 302a and 302b of electric power therein—when the coverplate 100 is attached to the outlet unit 104.

Figure 3:
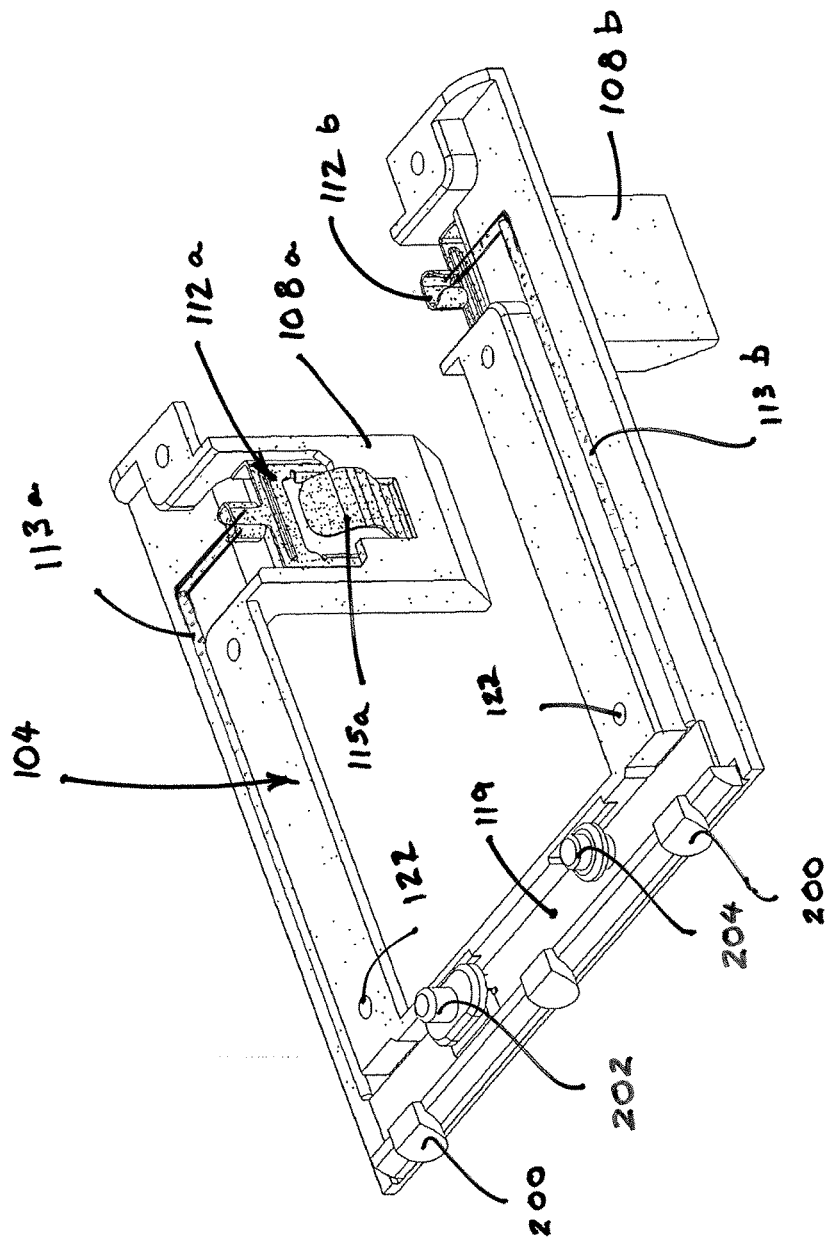
FIG. 3 is a perspective view of a component of the coverplate shown in FIG. 2, shown in an inverted condition to that shown in FIG. 2.
Figure 4:
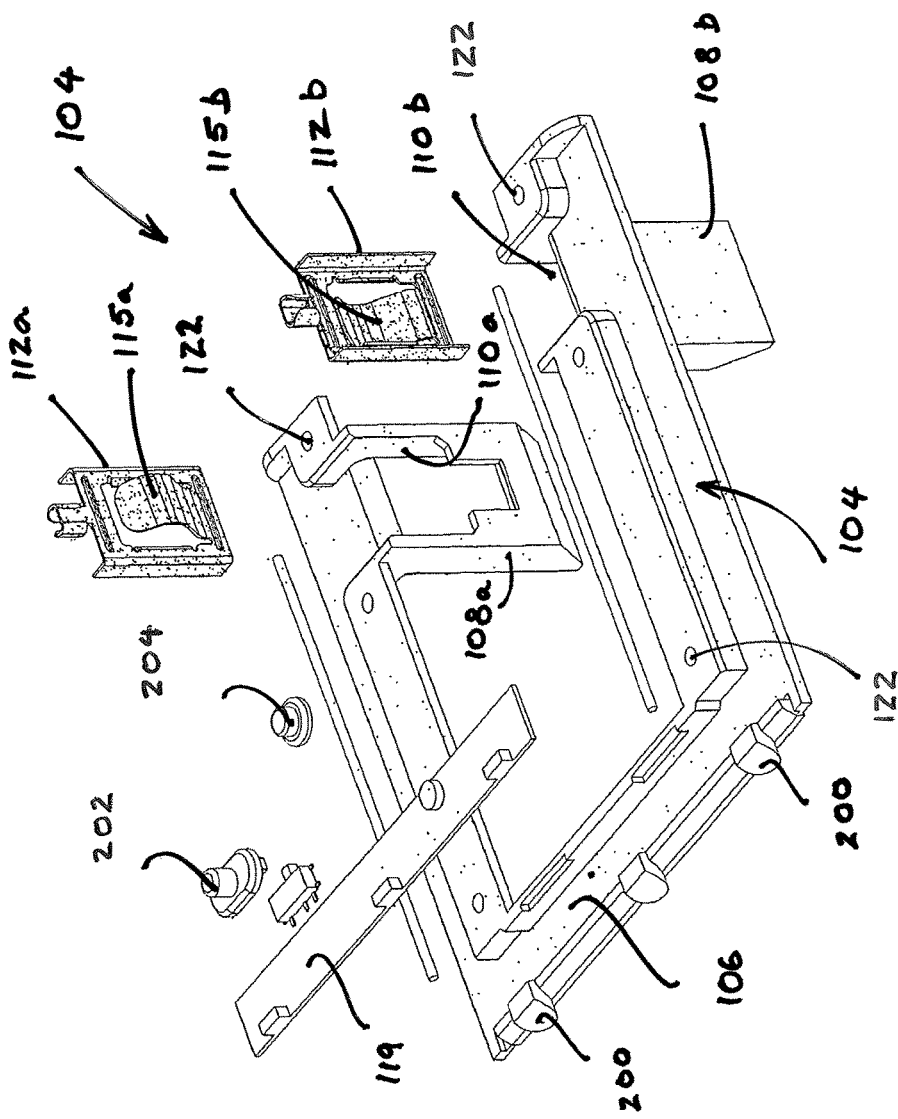
FIG. 4 is a perspective view of the component shown in FIG. 3, in partial exploded view.

With reference to FIGS. 3-4 it is shown how, during assembly of the coverplate 100, the conductors 112a, 112b and additional elements may be attached onto the support frame 104 before the support frame is attached to the faceplate 102. Thus, each conductor 112a, 112b is inserted into the chambers 110a, 110b molded within the two receptor flanges 108a, 108b respectively. Once inserted, the conductors may be held in the chambers under a friction fit so that the conductors do not fall out of the chambers when the support frame 104 is being manipulated during assembly.

A strip of LEDs 200 may be attached to the support frame 104, and the LEDs are spaced along the strip for being placed next to openings 201 in the coverplate. Two metallic wires 113a, 113b are placed on the support frame to connect the strip of LEDs 200 to the conductors 112a, 112b respectively. A switch 202 may be provided for completing a circuit 119 (shown FIG. 4) for powering the LEDs. A microprocessor 204 which may be a motion sensor, or a photo detector switch, may be further inserted into the circuit for activating the LEDs upon sensing motion, or upon sensing nightfall. The circuit may eventually be powered by electric power received via the connectors 112a, 112b via terminal points 302a, 302b on a power outlet 300 as described herein below with reference to FIG. 6.

The faceplate 102 takes the form of a plate lying in a plane, with the two apertures 101, previously identified, for allowing access to the power outlet from the front of the faceplate (FIG. 1A).

On the rear face of the faceplate (best seen in FIG. 2) two locator flanges 114a, 114b are molded, extending perpendicular to the plane of the faceplate 102. The locator flanges are positioned to line up with and to mate with the receptor flanges 108a, 108b respectively on the support frame 104. In some embodiments, the locator flanges may be sized to neatly fit within the chambers 110a, 110b in the receptor flanges 108a, 108b, as may be envisaged by reference to FIGS. 1B, and 5.

Thus, assembly of the coverplate 100 may be understood starting at FIG. 4, thence to FIG. 3, thence to FIG. 2, thence to FIG. 1B and FIG. 5 which is a sectional view of FIG. 1B taken substantially along the line A-A in FIG. 1B.

In FIG. 4 it is shown how the conductors 112a, 112b in a separated condition are initially positioned above the chambers 110a, 110b in the receptor flanges 108a, 108b. The conductors are then pressed down into the chambers, which are sized to receive the conductors under a friction fit, so that the conductors do not fall out of the chambers during ongoing assembly. This aspect is shown in FIG. 3. At this point, other components of the faceplate may be attached to the support frame 104. The strip of LEDs 200 may be attached. The circuit 119 for powering the LEDs may be attached. The two wires 113a, 113b may be attached at one end to the conductors 112a, 112b, and at the other end to the circuit 119. These aspects are also shown in FIG. 3.

Once all the elements of the support frame 104 are assembled into the support frame as a single unit, the support frame may be inverted for further assembly, as shown in FIG. 2. At this point, there may be only two components for attachment to each other, namely the faceplate 102 which is to be attached to the support frame 104 with all of its electric elements already attached. The support frame is pressed down onto the faceplate 102, so that the pins 120 are inserted into the holes 122. Further, the alignment flanges 114a, 114b which are molded onto the faceplate 102, may be inserted into the chambers 110a, 110b on the receptor flanges 108a, 108b. This action causes the faceplate 102 in conjunction with the receptor flanges 108a, 108b to close off the chambers 110a, 110b, leaving only small windows 117a, 117b through which curved portions 115a, 115b of the connectors protrude respectively, as may be understood with reference to FIG. 1B and FIG. 5. The conductors 112a, 112b are now neatly captured and enclosed within the chambers 110a, 110b, so that only a small portion of the conductors protrude outwardly through windows for connection to power points 302a, 302b as shown in FIG. 6. This aspect provides a highly advantageous novel feature, allowing an assembler to assemble all the components on the support frame 104 first, and then to snap the support frame into connection with the faceplate 102 in one action, with the result that the conductors are surrounded by non-conductive plastic material except for a small curved portion 115a, 115b protruding through windows 117a, 117b from the chambers 110a, 110b in order to contact with the power supply 302a, 302b (FIG. 6) when the coverplate 100 is attached to the power supply outlet 300.

The resulting faceplate 100 is easy to assemble, and it has a high degree of protection against contact to a live component by a workman installing the faceplate onto a power outlet as shown in FIG. 6. It will be appreciated that, apart from the conductors, and the other electronic systems described, the cover plate and the support plate are formed from a moldable polymer that are not conductive.

Accordingly, there is described a novel system and method that addresses needs in the art. The present invention may, of course, be carried out in other specific ways than those herein set forth without departing from the essential characteristics of the invention. The present embodiments are, therefore, to be considered in all respects as illustrative and not restrictive, while the scope of the invention is set forth in the claims that follow.

I claim:

1. A coverplate for attachment to a standard electric power outlet having two electric power elements separated by a standard distance, the coverplate comprising:
  a faceplate occupying a first imaginary plane and defining at least one opening sized to provide access to the standard electric power outlet when the power outlet is covered by the faceplate;
  a support frame detachably attached to the faceplate, the support frame comprising:
    a U-shaped element occupying a second imaginary plane parallel with the first imaginary plane;
    a first receptor flange extending from the U-shaped element, the first receptor flange defining a first chamber,
    a second receptor flange extending from the U-shaped element, the second receptor flange defining a second chamber,
    a first conductor positioned within the first chamber;
    a second conductor positioned within the second chamber;
    wherein the first conductor and the second conductor are spaced apart by a first distance which is equal to the standard distance on the standard electric power outlet.

2. The coverplate of claim 1, wherein the first conductor and the second conductor are held within the first chamber and the second chamber respectively by friction fit.

3. The coverplate of claim 1, wherein the first receptor flange and the second receptor flange extend perpendicular to the second imaginary plane.

4. The coverplate of claim 1, wherein the support frame is detachably attached to the faceplate via locator pins inserted within locator holes.

5. The coverplate of claim 1, wherein the support frame further includes at least one LED connected by an electric circuit to the first conductor and the second conductor.

6. The coverplate of claim 1, wherein a first locator flange and a second locator flange are attached to the faceplate, each extending perpendicular to the first imaginary plane and being positioned to coincide with and to be at least partially surrounded by the first receptor flange and second receptor flange respectively.

7. The coverplate of claim 6, wherein the first chamber defines a first window through which a portion of the first conductor protrudes, and the second chamber defines a second window through which a portion of the second conductor protrudes.

8. A method for assembling a coverplate for attachment to a standard electric power outlet, the method comprising:
  providing a U-shaped element to which are attached a first receptor element and a second receptor element,
  inserting a first conductor into a first chamber defined by the first receptor element;
  inserting a second conductor into a second chamber defined by the second receptor element;
  attaching the U-shaped element to a faceplate.

9. The method of claim 8, wherein inserting a first conductor into a first chamber includes retaining the first conductor in the first chamber by friction fit and inserting a second conductor into a second chamber includes retaining the second conductor in the second chamber by friction fit.

10. The method of claim 8, wherein attaching the U-shaped element to a faceplate includes inserting locator pins within locator holes.

11. The method of claim 8, wherein attaching the U-shaped element to the faceplate includes:
  enclosing the first chamber such that a curved portion of the first conductor protrudes from a first window in the first chamber; and
  enclosing the second chamber such that a curved portion of the second conductor protrudes from a second window in the second chamber.

* * * * *